United States Patent
Krol

(10) Patent No.: US 6,328,184 B1
(45) Date of Patent: Dec. 11, 2001

(54) WINE STORAGE TANK

(75) Inventor: Ronald M. Krol, The Dalles, OR (US)

(73) Assignee: AAA Metal Fabrication, Inc., The Dalles, OR (US)

( * ) Notice: Subject to any disclaimer, the term of this patent is extended or adjusted under 35 U.S.C. 154(b) by 0 days.

(21) Appl. No.: 09/535,407

(22) Filed: Mar. 27, 2000

(51) Int. Cl.⁷ .................................................. B67D 5/06
(52) U.S. Cl. ........................ 222/185.1; 52/197; D23/205
(58) Field of Search ................................ 222/185.1, 462, 222/181.1, 181.2, 181.3; 52/192, 197; D23/205

(56) References Cited

U.S. PATENT DOCUMENTS

| | | | |
|---|---|---|---|
| 1,457,038 | * 5/1923 | Lane et al. ................... | 222/185.1 X |
| 2,246,497 | * 6/1941 | Beck ............................. | 222/185.1 X |
| 2,561,721 | * 7/1951 | Ardito ........................... | 222/185.1 X |
| 2,718,333 | * 9/1955 | Wolf ............................. | 222/462 X |
| 4,660,733 | 4/1987 | Snyder et al. ................. | 220/69 |
| 4,785,958 | 11/1988 | Snyder et al. ................. | 220/5 A |
| 4,836,421 | * 6/1989 | Miyoshi et al. .............. | 222/185.1 X |
| 4,840,284 | 6/1989 | Snyder et al. ................. | 220/5 |
| 5,339,996 | * 8/1994 | Dubbert et al. ............... | 222/185.1 |
| 5,566,848 | 10/1996 | Rude et al. .................... | 220/4.12 |
| 5,718,351 | 2/1998 | Rude et al. .................... | 220/571 |

* cited by examiner

Primary Examiner—Kenneth Bomberg
(74) Attorney, Agent, or Firm—Birdwell, Janke & Durando, PLC

(57) ABSTRACT

A wine storage tank. At least one sidewall is provided having a semi-cylindrical shape. The axis of the sidewall is inclined with respect to the horizontal so that gravity can assist the sliding of solid material toward a discharge opening for emptying the tank.

24 Claims, 2 Drawing Sheets

WINE STORAGE TANK

BACKGROUND OF THE INVENTION

The present invention relates to a wine storage tank, particularly a wine storage tank which is particularly advantageous for use in processing red wine.

Red wine is obtained by crushing grapes and storing the crushed grapes in a tank in which the wine is left to ferment. The solution that results includes grape juice, seeds and skins. Leaving the skins in the solution imparts color and additional flavor to the wine and distinguishes the process from that used for making white wine.

During fermentation, the skins tend to float to the top of the tank, and after fermentation is complete clear wine is removed from the tank from a relatively small liquid discharge outlet at the bottom of the tank. Remaining in the tank is a mass of wet skins and seeds which amount to about 25% of the original volume of the solution. It is often desirable to let this sit for a period of time to extract as much juice runout as possible, so that the solid material may become relatively dry. However, this material must eventually be removed. This presents the problem that the solid material as it dries becomes increasingly difficult to remove from the tank.

This problem is typically solved by employing personnel to enter the tank, collect the material by raking or shoveling, and push the material through a specially adapted solids discharge outlet. An ancillary problem is that within the confined interior of the tank, these workers are exposed to a risk of asphyxiation from carbon dioxide created by the fermentation. It is often necessary, therefore, to remove this carbon dioxide before such entry is permitted.

Wine tanks typically have a flat floor that slopes about ½" per foot with respect to the horizontal. Very little slope is needed to drain liquids; however, solid material tends to stick to the walls of the tank and the gravity assist provided by such a slope is insufficient to permit the material to self-evacuate. Making the angle of the floor steeper facilitates sliding the material toward the bottom of the tank; however, a completely flat floor does not provide for directing the material to the outlet, so much of the material is stopped by the sidewall(s) of the tank, where it becomes stuck.

Like many types of tanks, wine tanks are typically formed of sheet metal. Sheet metal provides a good balance of cost and performance but complex forming in sheet metal can be expensive, especially for smaller runs. For example, shaping features into the floor to improve its capability for directing material to the outlet adds undesirably to the cost of manufacturing the tank.

Another problem with prior art wine tanks is that the flat floor must often be structurally enhanced underneath, because wine tanks can carry very heavy loads. Some wine tanks hold up to 25,000 gallons, or over 10 tons. On the other hand, frusto-conically shaped tanks which are stronger are also undesirably expensive to fabricate in sheet metal.

Accordingly, there is a need for a wine storage tank that provides for easier and less costly evacuation of solid material in the tank as well as decreased cost of manufacture.

SUMMARY OF THE INVENTION

The wine storage tank of the present invention solves the aforementioned problems and meets the aforementioned needs by providing at least one sidewall having a semi-cylindrical shape. The axis of the sidewall is inclined with respect to the horizontal so that gravity can assist the sliding of solid material that may rest on higher portions of the interior surface down to lower portions of the surface of the sidewall for discharge out an opening for emptying the tank.

Therefore, it is a principal object of the present invention to provide a novel and improved wine storage tank.

It is another object of the present invention to provide a wine storage tank that provides for easier and less costly evacuation of the tank.

It is still another object of the present invention to provide a wine storage tank that provides for decreased cost of manufacturing a formed embodiment of the tank.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
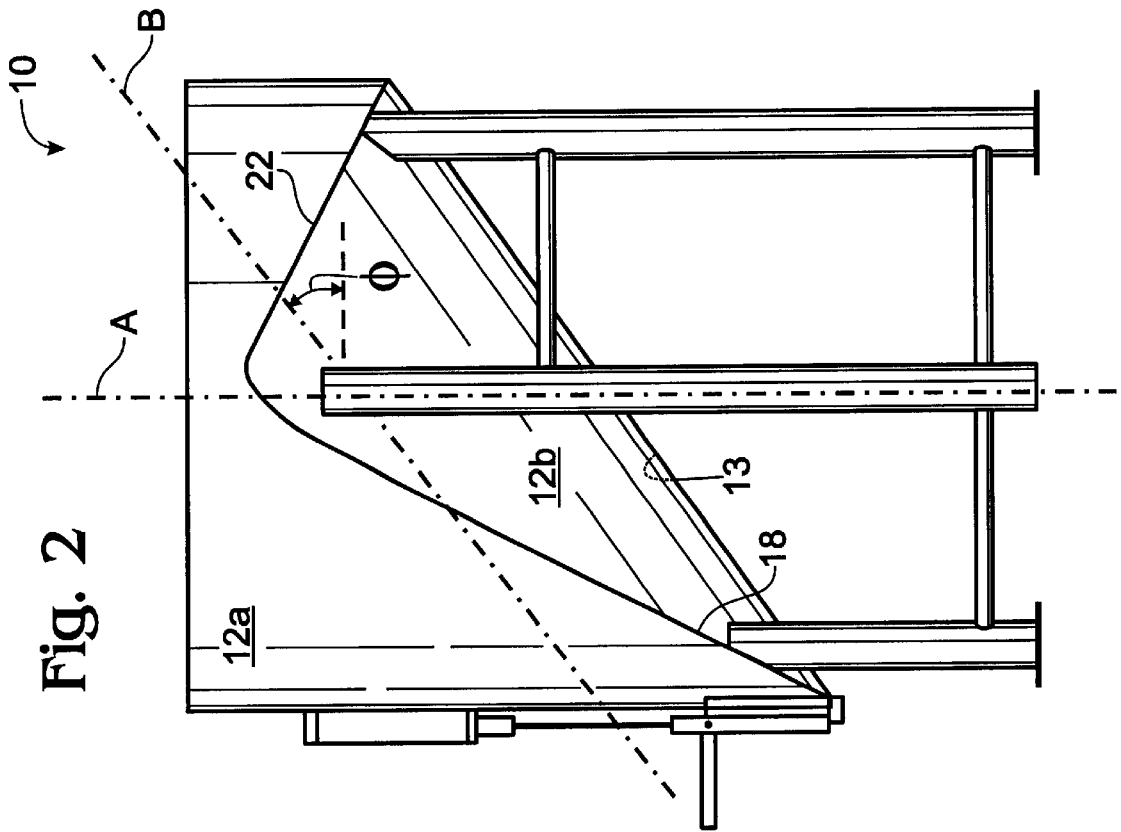
FIG. 1 is a pictorial view of a storage tank according to the present invention.
Figure 2:
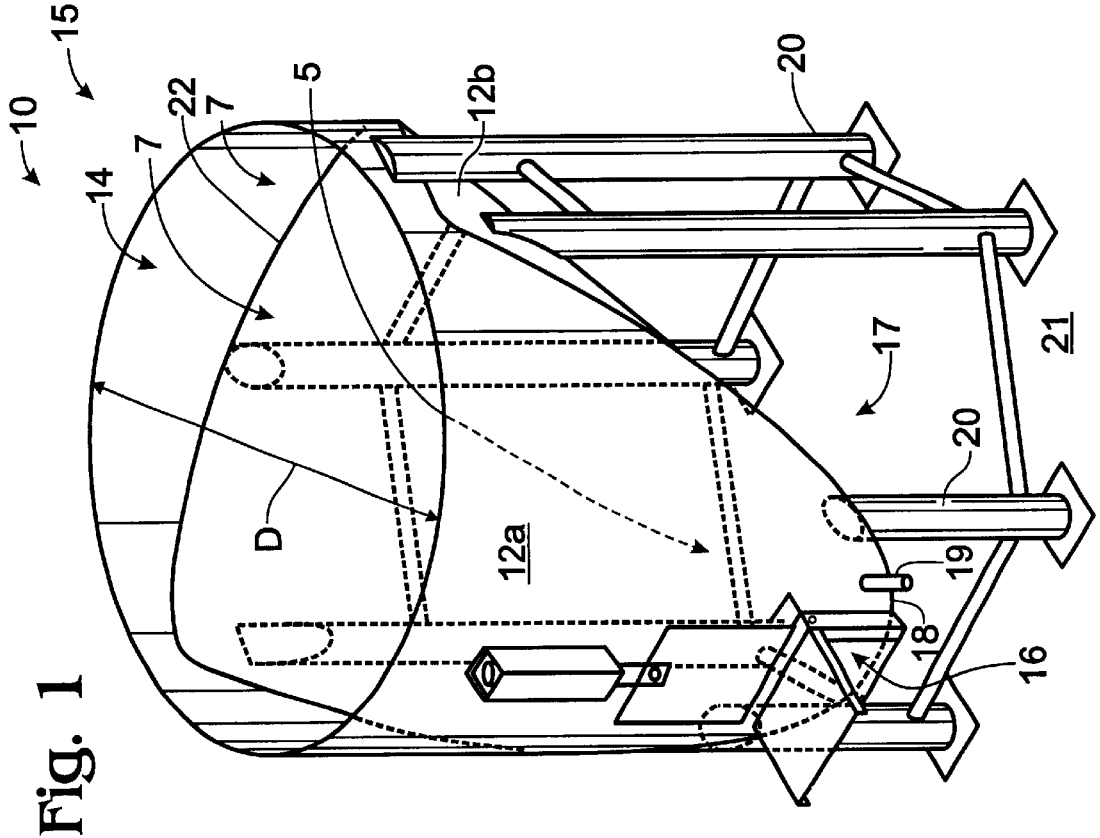
FIG. 2 is a side view of the storage tank of FIG. 1.

FIGS. 1 and 2 depict a preferred storage tank 10 according to the present invention. The preferred storage tank is especially suited as a wine tank, particularly a red wine tank wherein the grape juice incorporates a substantial amount of solid material such as grape skins and seeds. However, the tank 10 may be used to store materials, either solids or liquids or both, other than wine without departing from the principles of the invention.

The tank 10 includes front and rear sidewalls 12a and 12b respectively. The designations front and rear are arbitrary. Preferably, the sidewalls join or meet one another at both a top end 15 and a bottom end 17 of the tank. In the preferred embodiment, the sidewalls are separately fabricated sheet metal parts joined together by welding, though they may formed of other materials joined in other ways or may be formed together integrally.

At least the rear sidewall and, preferably, both sidewalls are formed as semi-cylinders. The cylindrical shape provides two outstanding advantages. First, in the typical sheet metal embodiment of the tank 10, cylindrical shapes are easier and less expensive to fabricate than the alternative shapes known in the art, such as frusto-conical shapes. Second, because the sidewalls are substantially curved as opposed to being flat, they are stronger and costly bracing to support heavy loads, such as is typically required for the flat floors of common prior art wine tanks, may be minimized or eliminated. This is a particularly advantageous aspect of the rear sidewall, which functions also as a floor of the tank 10 as indicated below. Moreover, a combination of the two advantages results over the substantially flat floor, wherein the cylindrical shape does not need either additional bracing or additional features formed in the floor to direct material to the tank's drain.

The semi-cylindrical sidewalls 12a and 12b define respective cylindrical axes "A" and "B" and the sidewall 12b defines a parallel, concave interior surface 13. The axis "B" is inclined an angle φ with respect to the horizontal to permit gravity to facilitate sliding of any loose solid material on the interior surface. The angle φ is preferably within the range of about 10–50 degrees, and is most preferably about 35–45 degrees for the exemplary wine tank. Very small angles φ are adequate for evacuating liquids and solids that are highly pourable, but angles less than about 10 degrees do not perform well for evacuating grape skins and seeds in a red wine storage tank. Large angles φ provides for improved evacuation; however, this comes at the cost of decreasing storage volume for a given tank height and footprint, and these aspects must be weighed against one another in determining an optimum angle in a particular application.

In FIGS. 1 and 2, the tank 10 is oriented so that the cylindrical axis "A" of the front sidewall 12a is vertical; however, this is not essential to the invention and both the cylindrical axes "A" and "B" may be inclined with respect to the horizontal if desired, with the cylindrical axis "A" being inclined in the same direction as the axis "B" or in the opposite direction. The desired orientation of the tank 10 as a whole is provided through the use of suitable legs 20 that are attached to the tank for supporting the tank above a ground surface 21.

The tank has an opening 14 for filling the tank at the top end 15 of the tank, and a solids discharge opening 16 for discharging or evacuating solid material from the tank at the bottom end 17 of the tank. The tank also has a liquid discharge opening 19 that may be used to drain liquid from the solid material remaining in the tank.

The solids discharge opening 16 is disposed to receive any solid material on the surface 13 that slides under the influence of gravity from higher portions 7 of the tank down to lower portions 5, and pass this material to the outside of the tank. The opening 16 is shown as being through the front sidewall 12a, though it could be through the rear sidewall or through both sidewalls if desired without departing from the principles of the invention.

Preferably, the semi-cylindrical front and rear sidewalls have the same cylindrical diameter "D." Where joined as separate pieces of sheet metal, the front and rear sidewalls meet along a line of joinder 22 at the top end 15 of the tank, and a line of joinder 18 at the bottom end 17 of the tank. The line of joinder 22 is an ellipse as can be best seen in FIG. 1. The diameter "D" may also be the same as the diameter of the opening 14.

Figure 3:
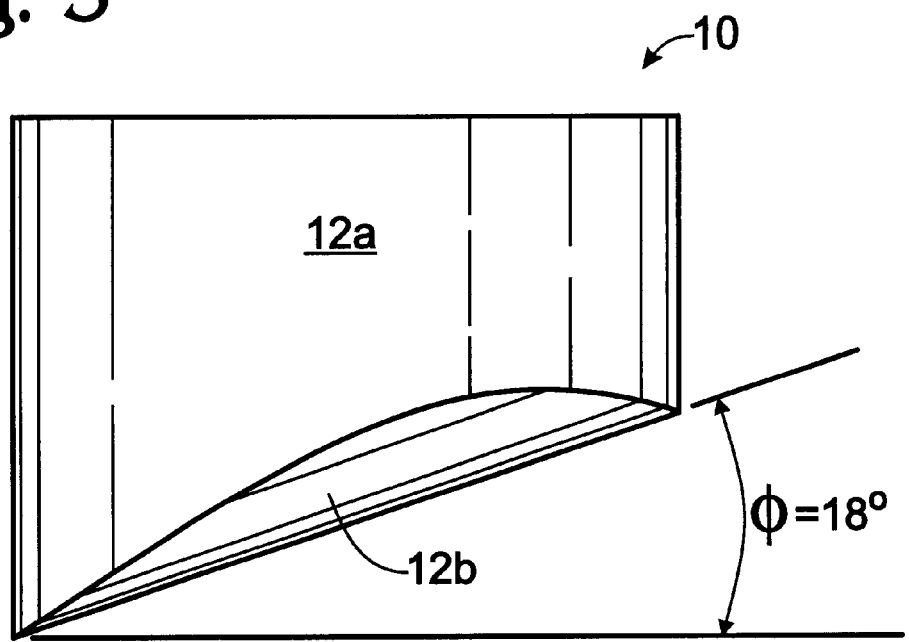
FIG. 3 is a side view of an alternative configuration of the storage tank of FIG. 1.
Figure 4:
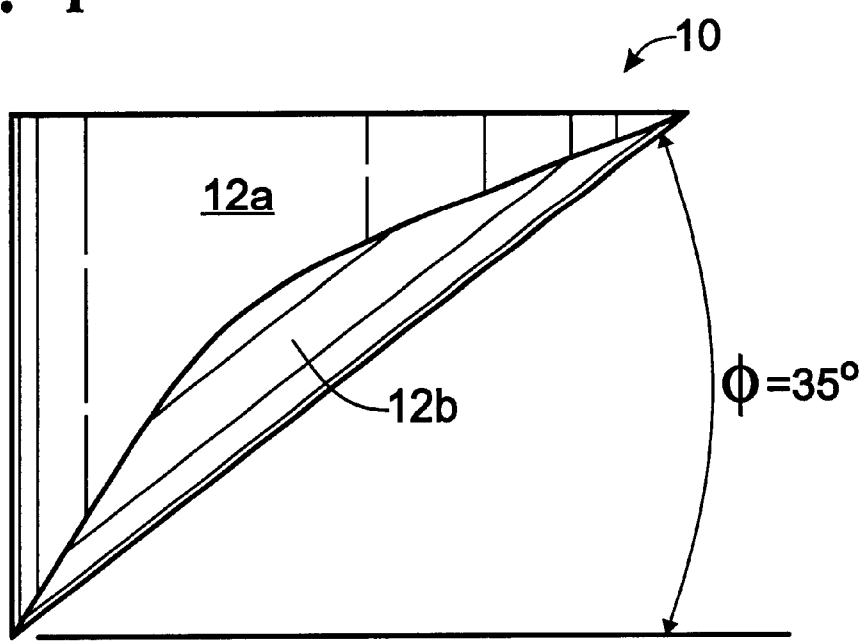
FIG. 4 is a side view of another alternative configuration of the storage tank of FIG. 1.

Referring to FIGS. 3 and 4, alternatively, the diameter of the cylinder corresponding to the rear sidewall 12b may be larger than the diameter of the cylinder corresponding to the front sidewall 12a (this may be easiest to visualize in the extreme case as the intersection of an upright cylinder with a sloped rear sidewall having infinite diameter, i.e., a plane). In both FIGS. 3 and 4, the diameter of the rear sidewall 12b is twice the diameter of the front sidewall 12a.

It is to be recognized that, while a particular method and apparatus for reducing contamination in a plastic container has been shown and described as preferred, other configurations and methods could be utilized, in addition to configurations already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A wine storage tank, comprising:
   a first semi-cylindrical sidewall having a first cylindrical axis of inclination; and
   a second semi-cylindrical sidewall having a second cylindrical axis of inclination that is anti-parallel to said first cylindrical axis, said second semi-cylindrical sidewall being joined to said first semi-cylindrical sidewall at respective edges thereof along a curvilinear line of joinder extending from a bottom end of the storage tank upwardly along two sides of the storage tank, so as to create an enclosed volume between said sidewalls.

2. The storage tank of claim 1, wherein a semi-elliptical edge of said second sidewall forms a second line of joinder with said first sidewall at a top end of the storage tank.

3. The storage tank of claim 2, further comprising an opening for emptying the tank through said first sidewall at said bottom end of the storage tank.

4. The storage tank of claim 3, further comprising legs attached to said second sidewall and extending therefrom so that, when resting on a horizontal surface, said first cylindrical axis is maintained in a substantially vertical orientation and said top end of the storage tank is at a greater elevation than said bottom end.

5. The storage tank of claim 4, wherein said second cylindrical axis is inclined between about 10 and 50 degrees from said first cylindrical axis.

6. The storage tank of claim 5, wherein said second cylindrical axis is inclined between about 35 and 45 degrees from said first cylindrical axis.

7. The storage tank of claim 3, wherein said second cylindrical axis is inclined between about 10 and 50 degrees from said first cylindrical axis.

8. The storage tank of claim 7, wherein said second cylindrical axis is inclined between about 35 and 45 degrees from said first cylindrical axis.

9. The storage tank of claim 2, further comprising legs attached to said second sidewall and extending therefrom so that, when resting on a horizontal surface, said first cylindrical axis is maintained in a substantially vertical orientation and said top end of the storage tank is at a greater elevation than said bottom end.

10. The storage tank of claim 9, wherein said second cylindrical axis is inclined between about 10 and 50 degrees from said first cylindrical axis.

11. The storage tank of claim 10, wherein said second cylindrical axis is inclined between about 35 and 45 degrees from said first cylindrical axis.

12. The storage tank of claim 2, wherein said second cylindrical axis is inclined between about 10 and 50 degrees from said first cylindrical axis.

13. The storage tank of claim 12, wherein said second cylindrical axis is inclined between about 35 and 45 degrees from said first cylindrical axis.

14. The storage tank of claim 1, further comprising an opening for emptying the tank through said first sidewall at said bottom end of the storage tank.

15. The storage tank of claim 14, further comprising legs attached to said second sidewall and extending therefrom so that, when resting on a horizontal surface, said first cylindrical axis is maintained in a substantially vertical orientation and said top end of the storage tank is at a greater elevation than said bottom end.

16. The storage tank of claim 15, wherein said second cylindrical axis is inclined between about 10 and 50 degrees from said first cylindrical axis.

17. The storage tank of claim 16, wherein said second cylindrical axis is inclined between about 35 and 45 degrees from said first cylindrical axis.

18. The storage tank of claim 14, wherein said second cylindrical axis is inclined between about 10 and 50 degrees from said first cylindrical axis.

19. The storage tank of claim 18, wherein said second cylindrical axis is inclined between about 35 and 45 degrees from said first cylindrical axis.

20. The storage tank of claim 5, further comprising legs attached to said second sidewall and extending therefrom so that, when resting on a horizontal surface, said first cylindrical axis is maintained in a substantially vertical orientation and said top end of the storage tank is at a greater elevation than said bottom end.

21. The storage tank of claim 20, wherein said second cylindrical axis is inclined between about 10 and 50 degrees from said first cylindrical axis.

22. The storage tank of claim 21, wherein said second cylindrical axis is inclined between about 35 and 45 degrees from said first cylindrical axis.

23. The storage tank of claim 1, wherein said second cylindrical axis is inclined between about 10 and 50 degrees from said first cylindrical axis.

24. The storage tank of claim 23, wherein said second cylindrical axis is inclined between about 35 and 45 degrees from said first cylindrical axis.

* * * * *

UNITED STATES PATENT AND TRADEMARK OFFICE
CERTIFICATE OF CORRECTION

PATENT NO. : 6,328,184 B1
DATED : December 11, 2001
INVENTOR(S) : Ronald M. Krol It is certified that error appears in the above-identified patent and that said Letters Patent is hereby corrected as shown below:

Column 5,
Line 4, change "claim 5," to -- claim 1 --.

Signed and Sealed this

Fifteenth Day of February, 2005

JON W. DUDAS
*Director of the United States Patent and Trademark Office*